United States Patent
Ghosh et al.

(10) Patent No.: US 9,866,626 B2
(45) Date of Patent: Jan. 9, 2018

(54) DOMAIN-SPECIFIC PATTERN DESIGN

(71) Applicant: International Business Machines Corporation, Armonk, NY (US)

(72) Inventors: Rahul Ghosh, Bangalore (IN); Hugh E. Hockett, Raleigh, NC (US); Aaron J. Quirk, Cary, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/847,074

(22) Filed: Sep. 8, 2015

(65) Prior Publication Data

US 2017/0068524 A1   Mar. 9, 2017

(51) Int. Cl.
  *G06F 9/44*   (2006.01)
  *H04L 29/08*  (2006.01)
  *G06F 9/445*  (2006.01)

(52) U.S. Cl.
  CPC .............. *H04L 67/10* (2013.01); *G06F 8/63* (2013.01); *H04L 67/02* (2013.01); *G06F 8/10* (2013.01); *G06F 8/20* (2013.01); *G06F 8/71* (2013.01)

(58) Field of Classification Search
  CPC ..... G06F 8/10; G06F 8/20; G06F 8/24; G06F 8/60; G06F 8/61; G06F 8/71; G06F 9/44505
  See application file for complete search history.

(56) References Cited

U.S. PATENT DOCUMENTS

| | | | |
|---|---|---|---|
| 8,209,687 B2 | 6/2012 | Yuyitung et al. | |
| 8,751,620 B2 * | 6/2014 | Anderson | G06F 8/60 709/223 |
| 8,924,539 B2 | 12/2014 | Ferris et al. | |
| 9,116,767 B1 * | 8/2015 | Arif | G06F 8/60 |
| 9,262,144 B1 * | 2/2016 | Apte | G06F 8/60 |
| 9,317,311 B2 * | 4/2016 | Anderson | G06F 9/45533 |
| 9,329,982 B2 * | 5/2016 | Arif | G06F 11/3065 |
| 9,354,869 B2 * | 5/2016 | Apte | G06F 8/71 |
| 9,569,249 B1 * | 2/2017 | Ghosh | G06F 9/45558 |
| 2007/0055972 A1 * | 3/2007 | Brown | G06F 8/61 717/174 |
| 2008/0134135 A1 * | 6/2008 | Elaasar | G06F 8/75 717/104 |
| 2009/0171705 A1 * | 7/2009 | Bobak | G06Q 10/06 705/80 |
| 2013/0262643 A1 * | 10/2013 | Anderson | G06F 8/60 709/223 |

(Continued)

OTHER PUBLICATIONS

Lu et al., "Pattern-Based Deployment Service for Next Generation Clouds", IEEE, Nov. 2013, pp. 464-471; <http://ieeexplore.ieee.org/stamp/stamp.jsp?arnumber=6655736>.*

(Continued)

*Primary Examiner* — Thuy Dao
*Assistant Examiner* — Ben C Wang
(74) *Attorney, Agent, or Firm* — Stephen R. Yoder

(57) ABSTRACT

A method is provided for building patterns with high level pattern topology requirements for deployment across multiple systems. The patterns are built based on pattern capabilities and configurations of the multiple systems. Such patterns can meet the desired pattern capabilities including high availability and/or continuous capabilities.

24 Claims, 4 Drawing Sheets

(56) References Cited

U.S. PATENT DOCUMENTS

| | | | |
|---|---|---|---|
| 2014/0229607 A1 | 8/2014 | Jung et al. | |
| 2014/0237443 A1* | 8/2014 | Pana | G06F 8/38 717/105 |
| 2014/0280805 A1 | 9/2014 | Sawalha | |
| 2014/0344808 A1* | 11/2014 | Banerjee | G06Q 30/04 718/1 |
| 2014/0373011 A1* | 12/2014 | Anderson | G06F 9/45533 718/1 |
| 2015/0019722 A1 | 1/2015 | Narayanan et al. | |
| 2015/0128131 A1* | 5/2015 | Cao | G06F 9/45533 718/1 |
| 2015/0277883 A1* | 10/2015 | Giammaria | G06F 8/60 707/722 |
| 2015/0277884 A1* | 10/2015 | Giammaria | G06F 8/60 717/120 |
| 2016/0011866 A1* | 1/2016 | Apte | G06F 8/71 717/121 |
| 2016/0034293 A1* | 2/2016 | Cao | G06F 9/45558 718/1 |
| 2016/0034294 A1* | 2/2016 | Christenson | G06F 9/45558 718/1 |
| 2016/0105342 A1* | 4/2016 | Hockett | H04L 43/0876 709/224 |
| 2016/0202962 A1* | 7/2016 | Arif | G06F 8/60 717/174 |
| 2016/0283223 A1* | 9/2016 | Breh | G06F 8/70 |

OTHER PUBLICATIONS

Jamshidi et al., "Cloud Migration Patterns: A Multi-cloud Service Architecture Perspective", Springer, Sep. 2015, ICSOC 2014, LNCS 8954, pp. 6-19; <https://link.springer.com/chapter/10.1007/978-3-319-22885-3_2>.*

Ng et al., "Toward Effective Deployment of Design Patterns for Software Extension: A Case Study", ACM, May 2006, WoSQ'06, pp. 51-56; <http://dl.acm.org/citation.cfm?id=1137713&CFID=968133826&CFTOKEN=57638951>.*

* cited by examiner

DOMAIN-SPECIFIC PATTERN DESIGN

BACKGROUND

The present invention relates generally to the field of cloud computing and service, and more particularly to pattern design.

Cloud computing, often referred to as simply "the cloud," is the delivery of on-demand computing resources—everything from applications to data centers—over the Internet on a pay-for-use basis. The cloud may include a public cloud, a private cloud, and/or a hybrid cloud. A public cloud is owned and operated by companies that offer rapid access over a public network to affordable computing resources. A private cloud is infrastructure operated solely for a single organization, whether managed internally or by a third party, and hosted either internally or externally. A hybrid cloud uses a private cloud foundation combined with the strategic integration and use of public cloud services.

In the cloud computing, a pattern is used to describe cloud service models and cloud deployment types in an abstract form to categorize the offerings of cloud providers. A pattern can be thought of as a recipe that combines all of the knowledge an organization acquired during years of complex infrastructure management tasks for optimizing and automating software deployment. A pattern describes, in a logical way, a repeatable solution that is based on specific sets of virtual images, middleware, applications, and run-time configurations. The result of deploying a pattern is a configured, tuned, and optimized application environment.

SUMMARY

According to an aspect of the present invention, there is a method, computer program product and/or system for building a deployment pattern for a subdomain that performs the following operations (not necessarily in the following order): receiving components to be implemented in a deployment pattern, the deployment pattern being a model of a topology and application environment; receiving an indication to deploy the deployment pattern in a subdomain, the subdomain including a plurality of systems; receiving a set of desired capabilities of the deployment pattern; analyzing characteristics for each system of the plurality of systems, the characteristics including one or more of the following: capability, location, and capacity; generating a set of proposed patterns that meet the set of desired capabilities of the deployment pattern, the set of proposed patterns being based on the analysis of characteristics of the plurality of systems; and deploying a proposed deployment pattern of the set of proposed patterns across the plurality of systems in the subdomain.

DETAILED DESCRIPTION

Figure 1:
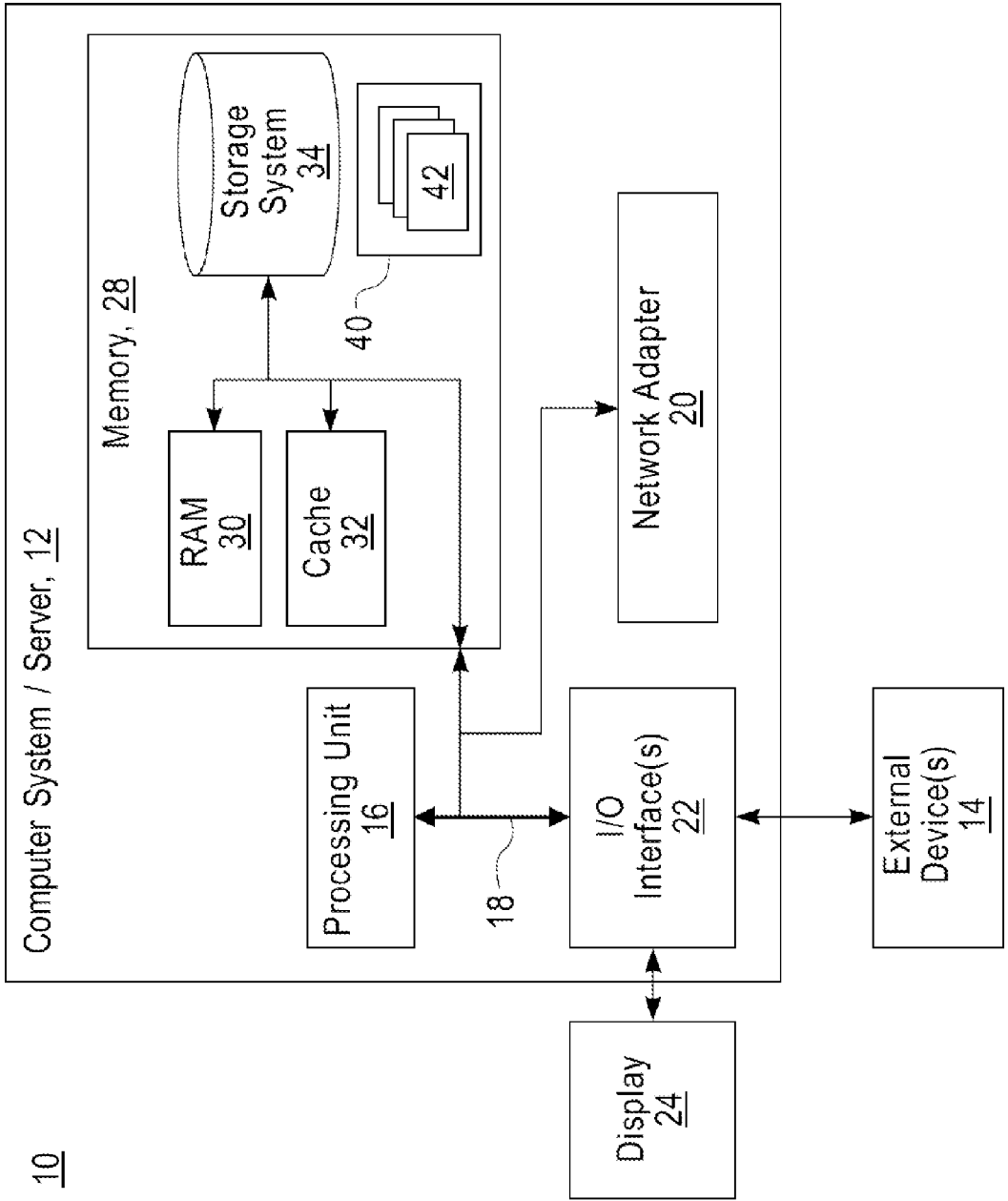
FIG. 1 depicts a cloud computing node used in a first embodiment of a system according to the present invention.

The present invention provides a method for building patterns that are deployed on multiple systems based on a designated deployment subdomain. The patterns are built according to information about the multiple systems in the designated deployment subdomain. The information includes the locations, capabilities, and capacity of each of the multiple systems in the designated deployment subdomain.

This Detailed Description section is divided into the following sub-sections: (i) The Hardware and Software Environment; (ii) Example Embodiments; and (iii) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
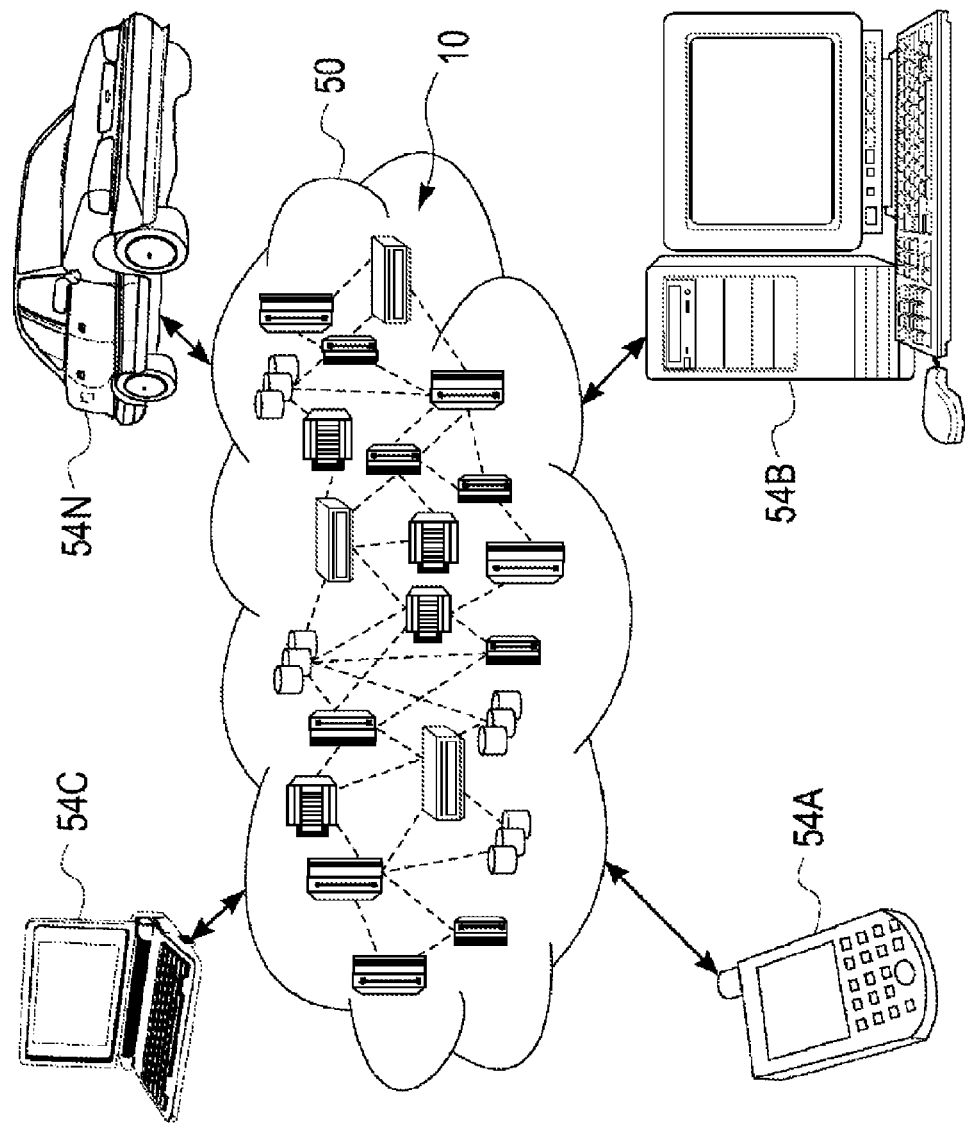
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
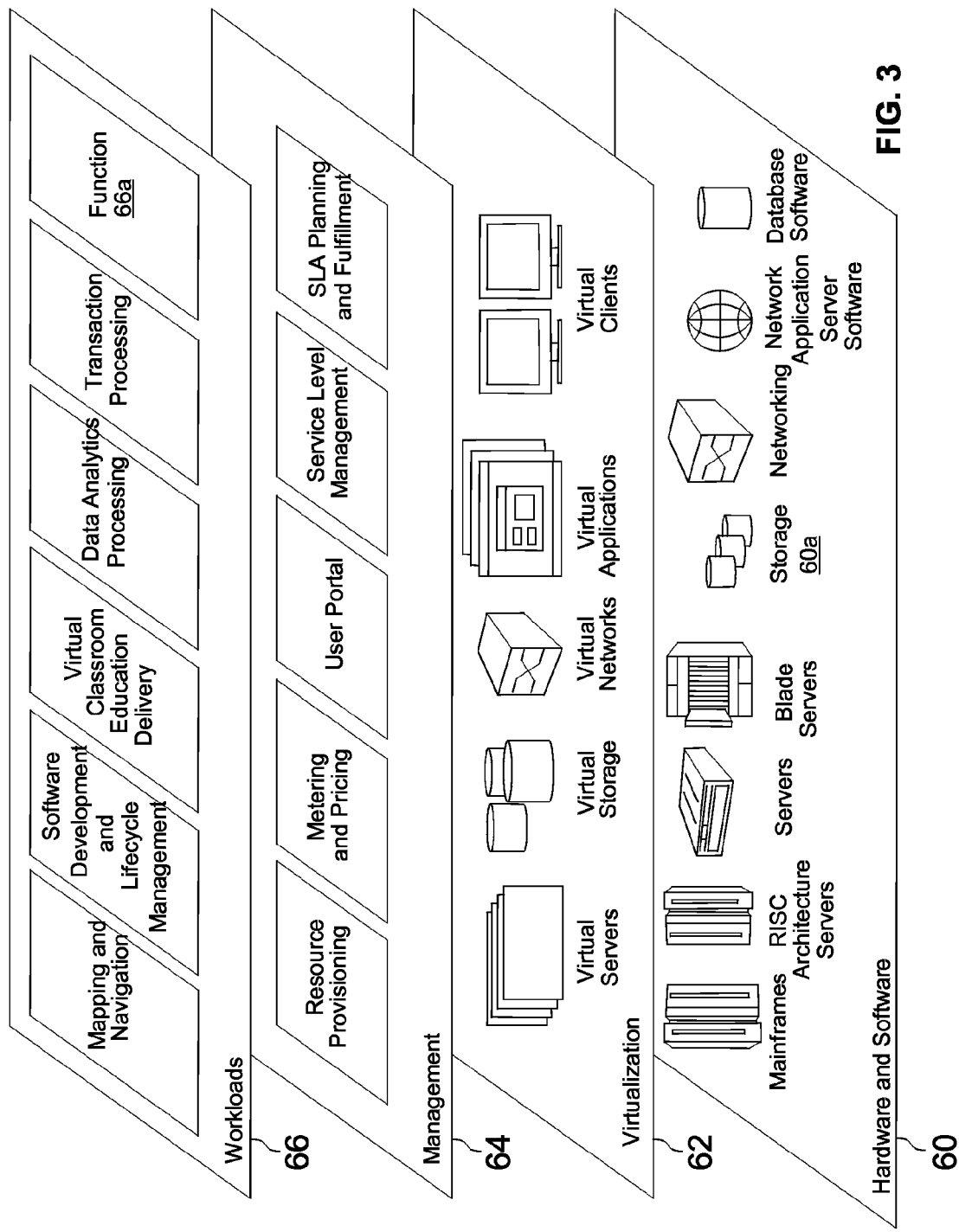
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiments

In an example embodiment, a PureApplication (PureApp) system is used as an example integrated cloud computing system with built-in storage, computing, and networking hardware tied together with managed hypervisors and pattern engine and/or pattern deployment software. (Note: the term(s) "PureApplication" and/or "PureApp" may be subject to trademark rights in various jurisdictions throughout the world and are used here only in reference to the products or services properly denominated by the marks to the extent that such trademark rights may exist.)

In some embodiments of the present invention, the cloud computing system includes an integrated pattern engine that allows users to group together components (e.g., what ends up being virtual machines) that are designed to coordinate and build a business solution. For example, a simple pattern might be composed of an enterprise software component for application and integration middleware, database server components, and/or a hypertext transfer protocol (HTTP) web server front end. The components have definitions that allow them to discover and communicate with one another. This pattern can be deployed as many times as the user likes and each time it will receive different configuration, for example, unique IP addresses, and so on.

Some embodiments of the present invention are directed to providing the capability of grouping together multiple cloud computing systems to create what is called a deployment subdomain. Within the deployment subdomain, a single pattern may be constructed in such a way that its individual components (e.g., VMs) can be distributed automatically across multiple systems for high availability (HA) and/or continuous availability (CA) capabilities.

A visual editor (also referred to as a pattern user interface) may be used for designing, building, and managing patterns. The visual editor makes it easy to quickly construct and deploy fully configured, integrated, and dynamic cloud-based environments. In such a way, components can be dragged and dropped onto a topology pattern on the visual editor, and the pattern is shown graphically in the visual editor.

In this example embodiment, information about multiple systems in the deployment subdomain are received including the system locations of the multiple systems, capabilities, and capacity to build an optimized pattern for deployment that meets the desired capabilities of the patterns.

For example, a user may want to design a pattern that has CA capabilities. When building the pattern, the user can ask for pattern assistance and provide the intended subdomain that is going to be deployed. The subdomain, for example, comprises two systems with sufficient capacity. The subdomain characteristics are analyzed, and a pattern using components that have an initial deployment factor of two (one deployed instance for each of the two systems) is built. Further, an anti-colocation policy is added to ensure that each of the deployed components is spread across the two systems. The anti-colocation policy is something that can be specified to keep the VMs/components separate from one another to avoid a single failure (e.g., hardware failure of a compute node), thus preventing from taking out all the VMs at the same time.

If the subdomain comprises three systems with two in one geographic region and the third in a more remote location, the pattern may drive a recommendation, for example, for an active-active-passive (passive being the third system) configuration, among other potential alternatives when the pattern supports it.

An active-active configuration implies that both systems are running and accepting connections and processing requests for users. Doing this typically requires a shared data infrastructure like a shared database so changes are always kept in synchronization. An active-passive configuration or active-standby configuration implies that one system is running and accepting connections, and the other system is waiting to take over (but not accepting connections). Such configuration is usually applied to scenarios where something is require to be ready in case of a failure in the active node. In this case, data across both instances are not shared and both instances are not running at the same time.

Figure 4:
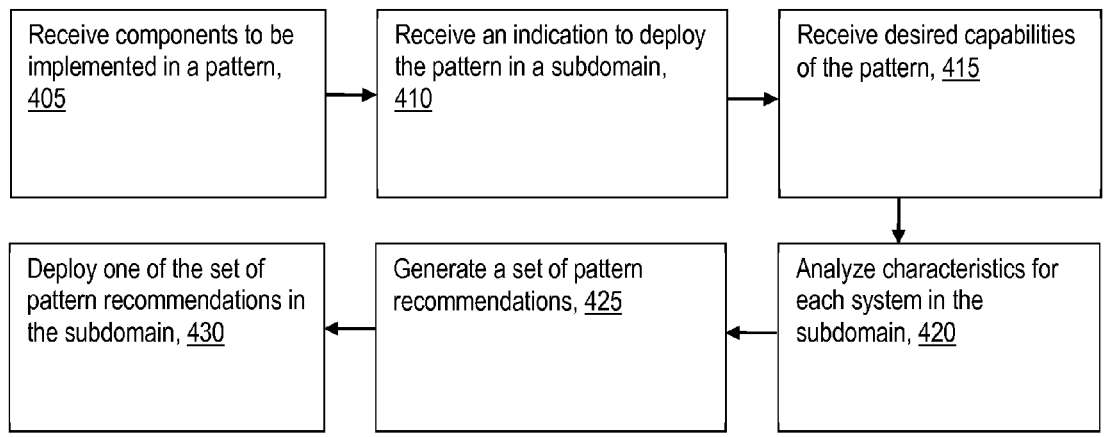
FIG. 4 is a flowchart showing a first embodiment method performed, at least in part, by the first embodiment system.
Figure 5:
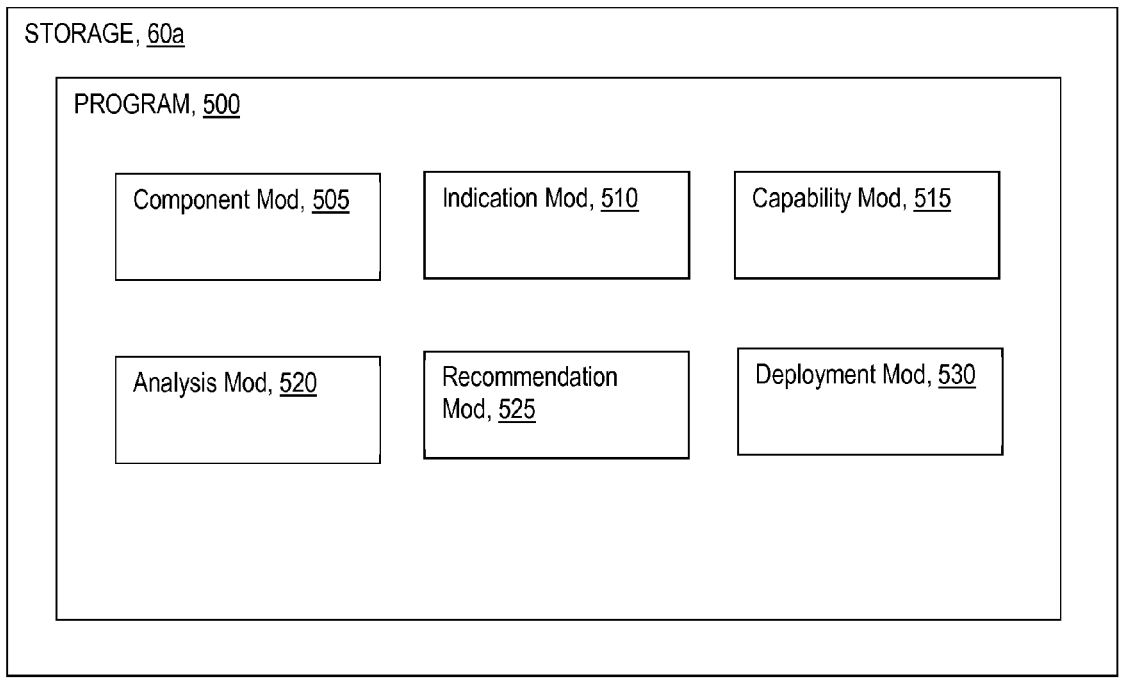
FIG. 5 is a block diagram showing a machine logic (for example, software) portion of the first embodiment system.

FIG. 4 shows flowchart 400 depicting a method according to the present invention. FIG. 5 shows program 500 for performing at least some of the method operations of flowchart 400. This method and associated software will now be discussed, over the course of the following paragraphs, with extensive reference to FIG. 4 (for the method operation blocks) and FIG. 5 (for the software blocks). One physical location where program 500 of FIG. 5 may be stored is in storage block 60a (see FIG. 3).

Processing begins at operation 405, where component module ("mod") 505 receives a set of components to be implemented in a deployment pattern. The deployment pattern, according to some embodiments, is a model of a topology and application environment that includes installation, configuration and management of middleware and applications. The set of components in the deployment pattern may include, but not limit to, one or more of an application and integration middleware, a database server, and a HTTP web server.

Processing proceeds to operation 410, where indication mod 510 receives an indication to deploy the deployment pattern in a subdomain. The subdomain comprises a plurality of systems that includes, but not limit to, one or more of an on-premise system, an off-premise system, and a public cloud provider.

Processing proceeds to operation 415, where capability mod 515 receives desired capabilities of the deployment pattern. The desired capabilities of the deployment pattern may include, but not limit to, one or more of the following: high availability, continuous availability, disaster recovery, scaling across systems, colocation policies per component and anti-colocation policies per component. Further, the desired capabilities include an indication of an active, passive or standby configuration. In this example, the desired capabilities are identified with reference to a pre-defined set of capabilities. Alternatively, the desired capabilities of the deployment pattern are input by a user via a user interface.

A colocation policy is something that can be specified to ensure that deployed VMs are physically kept close together, for example on the same server, thus, performance needs are met. Herein, a node with the passive configuration (i.e., a passive node) refers to a node that is almost ready to receive connections, but is not receiving connections and further does not have the proper pieces mounted (for example, a database that cannot be shared in an active-active configuration). At the time of failure, a database may be mounted to the passive node that becomes active and handles connections. A standby node refers to a node that is not ready (e.g., the VM is not yet started), but can be brought up in a reasonable amount of time to start accepting connections. In this way the standby node does not consume active CPU and/or memory resources until it is brought up to take over.

Processing proceeds to operation 420, where analysis mod 520 analyzes characteristics for each cloud computing system of the plurality of systems in the subdomain. The characteristics for each system include, but are not limit to, one or more of the following: capabilities, system locations, latency, high availability characteristics, capacity, and dependencies.

Processing proceeds to operation 425, where recommendation mod 525 generates a set of deployment pattern recommendations that meet the desired capabilities of the deployment pattern. The set of deployment pattern recommendations is based on the analysis of characteristics of each system of the plurality of systems. Thus, by combining information from the plurality of systems with the desired pattern capabilities, a preferred pattern, or set of deployment patterns, may be built and recommended for deployment across the plurality of systems in the subdomain.

This example embodiment focuses on a high level pattern architecture, and the relationship between each of the virtual machines as part of a pattern (for example a db2 primary and secondary, multiple processing nodes, and multiple http and/or web tiers). Further, this example embodiment evaluates the capabilities of the deployment targets (e.g., the plurality of systems) to make recommendations as to possible deployment layouts for each VM. Thus, the desired pattern topology capabilities as requested by a user may be achieved.

Processing proceeds to end at operation 430, where deployment mod 530 deploys one of the set of deployment pattern recommendations across the plurality of systems in the subdomain. One deployment pattern of the set of pattern recommendations may be selected by a user to be implemented. The user may further customize the selected pattern to generate a customized deployment pattern. Further, the customizations made by the user may be rechecked to ensure the customized pattern meets the requirements of desired capabilities of pattern before deploying. Further, policies are implemented to ensure that the deployment continues to meet the desired capabilities of the pattern.

Some embodiments of the present invention recognize the following facts, potential problems and/or potential areas for improvement with respect to the current state of the art: (i) a single pattern that can be deployed across multiple systems is needed; (ii) characteristics of multiple systems are required for building a pattern with high availability and continuous availability; and/or (iii) a deep understanding of both the workloads being deployed and the underlying cloud infrastructure and capabilities are desired.

Some embodiments of the present invention may include one, or more, of the following features, characteristics and/or advantages: (i) focusing on a high-level pattern architecture; (ii) concentrating on the relationship between each of the VMs as part of a pattern (for example, a database server primary and secondary, multiple processing nodes, and multiple http and/or web tiers); (iii) evaluating the capabilities of the deployment targets (for example, system locations, latency, high availability, capacity, dependencies, and other related capabilities) to make recommendations as to possible deployment layouts for each VM; (iv) meeting the needs of the high level topology of the VMs to achieve the desired pattern topology capabilities such as active/active, continuous availability, disaster recovery, scalability and others as requested by a user; and/or (vi) allowing a user to further customize the pattern, at which time the system can recheck to ensure it meets the requirements before deploying.

III. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for building a deployment pattern for a subdomain, the method comprising:
   receiving components of an abstraction layer to be implemented in a first deployment pattern;
   receiving a set of desired capabilities of the first deployment pattern corresponding to the received components;
   receiving an indication to deploy the first deployment pattern in a subdomain, the subdomain including a plurality of systems;
   responsive to the indication to deploy the first deployment pattern, analyzing characteristics specific to each system of the plurality of systems, the characteristics including one or more of the following: capability, location, and capacity;
   generating a set of proposed deployment patterns that meet the set of desired capabilities of the first deployment pattern, the set of proposed deployment patterns being based on the analysis of characteristics of the plurality of systems; and
   deploying a proposed deployment pattern of the set of proposed deployment patterns across the plurality of systems in the subdomain responsive to user-selection of the proposed deployment pattern;
   wherein:
   the first deployment pattern is a model of a topology and a corresponding application environment; and
   the set of desired capabilities of the first deployment pattern include one or more of the following: high availability, continuous availability, disaster recovery, scaling, colocation policies per component, and anti-colocation policies per component.

2. The method of claim 1, wherein the components in the first deployment pattern include one or more of an application and integration middleware, a database server, and a hypertext transfer protocol (HTTP) web server.

3. The method of claim 1, wherein the plurality of systems includes an on-premise system and a public cloud computing system provider.

4. The method of claim 1, wherein the desired capabilities further include an indication of an active, passive, or standby configuration.

5. The method of claim 1 further comprising:
   selecting the proposed deployment pattern from the set of proposed patterns to be implemented.

6. The method of claim 1 further comprising:
   receiving a customization by the user to the proposed deployment pattern to generate a custom deployment pattern.

7. The method of claim 6, further comprising:
   analyzing the custom deployment pattern to ensure the customization meets the set of desired capabilities.

8. The method of claim 1, wherein the first deployment pattern includes installation of middleware and applications, configuration of middleware and applications, and management of middleware and applications.

9. A computer program product for building a deployment pattern for a subdomain, the computer program product comprising a computer readable storage medium having stored thereon a set of instructions that, when executed by a processor, cause the process of building the deployment pattern for the subdomain by:
   receiving components of an abstraction layer to be implemented in a first deployment pattern;
   receiving a set of desired capabilities of the first deployment pattern corresponding to the received components;

receiving an indication to deploy the first deployment pattern in a subdomain, the subdomain including a plurality of systems;

responsive to the indication to deploy the first deployment pattern patter, analyzing characteristics specific to each system of the plurality of systems, the characteristics including one or more of the following: capability, location, and capacity;

generating a set of proposed deployment patterns that meet the set of desired capabilities of the first deployment pattern, the set of proposed deployment patterns being based on the analysis of characteristics of the plurality of systems; and deploying a proposed deployment pattern of the set of proposed deployment patterns across the plurality of systems in the subdomain responsive to user-selection of the proposed deployment pattern;

wherein:

the first deployment pattern is a model of a topology and a corresponding application environment; and the set of desired capabilities of the first deployment pattern include one or more of the following: high availability, continuous availability, disaster recovery, scaling, colocation policies per component, and anti-colocation policies per component.

10. The computer program product of claim 9, wherein the components in the first deployment pattern include one or more of an application and integration middleware, a database server, and a hypertext transfer protocol (HTTP) web server.

11. The computer program product of claim 9, wherein the plurality of systems includes an on-premise system and a public cloud computing system provider.

12. The computer program product of claim 9, wherein the desired capabilities further include an indication of an active, passive, or standby configuration.

13. The computer program product of claim 9 further comprising:

selecting the proposed deployment pattern from the set of proposed patterns to be implemented.

14. The computer program product of claim 9 further comprising:

receiving a customization by the user to the proposed deployment pattern to generate a custom deployment pattern.

15. The computer program product of claim 14, further comprising:

analyzing the custom deployment pattern to ensure the customization meets the set of desired capabilities.

16. The computer program product of claim 9, wherein the first deployment pattern includes installation of middleware and applications, configuration of middleware and applications, and management of middleware and applications.

17. A computer system for building a deployment pattern for a subdomain, the computer system comprising:

a processor(s) set; and a computer readable storage medium;

wherein:

the processor set is structured, located, connected and/or programmed to run program instructions stored on the computer readable storage medium; and the program instructions include:

receiving components of an abstraction layer to be implemented in a first deployment pattern;

receiving a set of desired capabilities of the first deployment pattern corresponding to the received components;

receiving an indication to deploy the first deployment pattern in a subdomain, the subdomain including a plurality of systems;

responsive to the indication to deploy the first deployment pattern, analyzing characteristics specific to each system of the plurality of systems, the characteristics including one or more of the following: capability, location, and capacity;

generating a set of proposed deployment patterns that meet the set of desired capabilities of the first deployment pattern, the set of proposed deployment patterns being based on the analysis of characteristics of the plurality of systems; and deploying a proposed deployment pattern of the set of proposed deployment patterns across the plurality of systems in the subdomain responsive to user-selection of the proposed deployment pattern;

wherein:

the first deployment pattern is a model of a topology and a corresponding application environment; and the set of desired capabilities of the first deployment pattern include one or more of the following: high availability, continuous availability, disaster recovery, scaling, colocation policies per component, and anti-colocation policies per component.

18. The computer system of claim 17, wherein the components in the first deployment pattern include one or more of an application and integration middleware, a database server, and a hypertext transfer protocol (HTTP) web server.

19. The computer system of claim 17, wherein the plurality of systems includes an on-premise system and a public cloud computing system provider.

20. The computer system of claim 17, wherein the desired capabilities further include an indication of an active, passive, or standby configuration.

21. The computer system of claim 17 further comprising:

selecting the proposed deployment pattern from the set of proposed patterns to be implemented.

22. The computer system of claim 17 further comprising:

receiving a customization by the user to the proposed deployment pattern to generate a custom deployment pattern.

23. The computer system of claim 17, further comprising:

analyzing the custom deployment pattern to ensure the customization meets the set of desired capabilities.

24. The computer system of claim 17, wherein the first deployment pattern includes installation of middleware and applications, configuration of middleware and applications, and management of middleware and applications.

* * * * *